US008175325B2

(12) United States Patent
Baum et al.

(10) Patent No.: US 8,175,325 B2
(45) Date of Patent: May 8, 2012

(54) METHOD AND APPARATUS FOR ENCODING/DECODING SYMBOLS CARRYING PAYLOAD DATA FOR WATERMARKING OF AN AUDIO OR VIDEO SIGNAL

(75) Inventors: Peter Georg Baum, Hannover (DE); Ulrich Schreiber, Hohenhameln/Equord (DE)

(73) Assignee: Thomson Licensing, Issy les Moulineaux (FR)

( * ) Notice: Subject to any disclaimer, the term of this patent is extended or adjusted under 35 U.S.C. 154(b) by 682 days.

(21) Appl. No.: 12/310,765

(22) PCT Filed: Aug. 15, 2007

(86) PCT No.: PCT/EP2007/058472

§ 371 (c)(1), (2), (4) Date: Mar. 6, 2009

(87) PCT Pub. No.: WO2008/028770

PCT Pub. Date: Mar. 13, 2008

(65) Prior Publication Data

US 2010/0021003 A1 Jan. 28, 2010

(30) Foreign Application Priority Data

Sep. 7, 2006 (EP) .................................... 06120311

(51) Int. Cl.
*G06K 9/00* (2006.01)

(52) U.S. Cl. ........ 382/100; 380/200; 380/201; 380/202; 380/203; 380/204; 348/384.1; 348/385.1; 348/386.1; 348/387.1; 348/388.1

(58) Field of Classification Search .................. 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS

2002/0107691 A1 8/2002 Kirovski et al.

FOREIGN PATENT DOCUMENTS

EP 1542227 6/2005
WO WO 2004/051918 6/2004

OTHER PUBLICATIONS

Search Report Dated Oct. 30, 2007.

*Primary Examiner* — Atiba O Fitzpatrick
(74) *Attorney, Agent, or Firm* — Robert D. Shedd; Jeffrey M. Navon

(57) ABSTRACT

Watermark information (denoted WM) consists of several symbols which are embedded continuously by reference sequence modulation in an audio or a video signal. At decoder site the WM is regained using correlation of the received signal with a corresponding reference sequence. The symbols form watermark data frames. The invention uses for the bit values ‘zero’ and ‘one’ in each payload symbol and for each payload symbol in a watermark data frame different reference sequences, without using synchronisation symbols. A logarithmic search is performed in the WM decoder to reduce the numbers of correlations to be calculated. The invention makes watermarking of critical sound signals much more robust.

12 Claims, 1 Drawing Sheet

METHOD AND APPARATUS FOR ENCODING/DECODING SYMBOLS CARRYING PAYLOAD DATA FOR WATERMARKING OF AN AUDIO OR VIDEO SIGNAL

This application claims the benefit, under 35 U.S.C. §365 of International Application PCT/EP2007/058472, filed Aug. 15, 2007, which was published in accordance with PCT Article 21(2) on Mar. 13, 2008 in English and which claims the benefit of European patent application No. 06120311.3, filed Sep. 7, 2006.

The invention relates to a method and to an apparatus for encoding symbols carrying payload data for watermarking therewith an audio or video signal, and to a method and to an apparatus for decoding symbols carrying payload data of a watermarked audio or video signal.

BACKGROUND

Watermark information (denoted WM) consists of several symbols which are embedded continuously in the carrier content, e.g. in (encoded) audio or video signals, e.g. in order to identify the author of these signals. At decoder site the WM is regained, for example by using correlation of the received signal with a known m-sequence if spread spectrum is used as underlying technology. Most WM technologies transmit redundancy bits for error correction.

Figure 3:
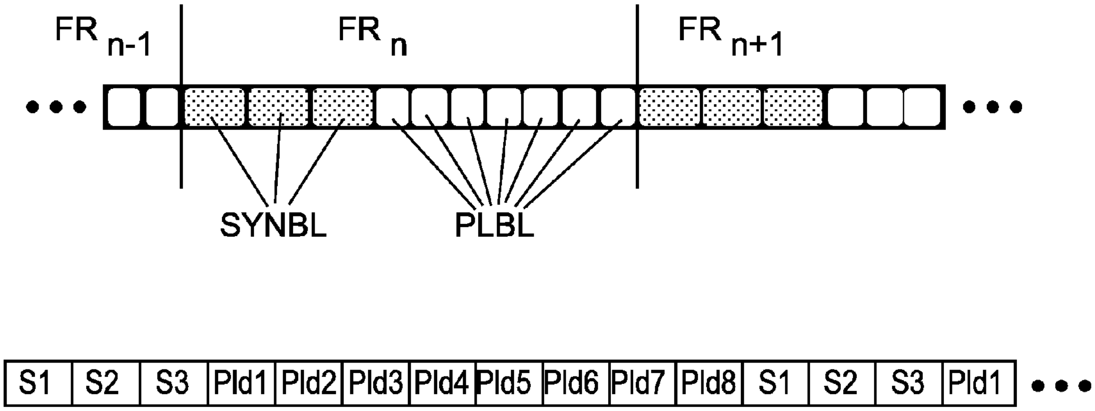

In many audio watermarking systems the payload data is organised in frames. A frame starts with one or more synchronisation symbols followed by one or more payload symbols. The synchronisation symbols signal only the start of the payload bits, whereas the payload symbols carry the actual payload bits including the bits used for error correction. The upper part of FIG. 3 shows three successive frames $FR_{n-1}$, $FR_n$ and $FR_{n+1}$. A frame consists of a number of synchronisation blocks SYNBL (at least one synchronisation block) which are used to detect the start of the frame at decoder side, and a number of payload blocks PLBL (at least one valid payload block or symbol) which carry the actual information. Frames are inserted synchronously or asynchronously into the audio stream, dependent on the technology. The insertion of the payload blocks is done consecutively, i.e. synchronised after the SYNBL blocks. Each payload block holds one or more bits of information.

Many audio watermarking technologies like spread spectrum, or phase shaping disclosed in EP05090261, embed some kind of reference sequences in the carrier signal. If binary phase keying (BPSK) is used, the polarity of the sequence encodes the bit value. For code shift keying (CSK), different sequences are used for the different values of the transmitted bit value. The lower part of FIG. 3 shows a frame that starts with three synchronisation symbols S1, S2, and S3 which are followed by eight payload symbols Pld1 to Pld8. At detector or receiver side it happens that a received erroneous watermark symbol cannot be decoded for example because of attacks. The payload data is then error corrected and decoded.

INVENTION

However, the sync symbols SYNBL are essential for decoding. In case not all sync blocks can be decoded at receiver side the whole frame is lost even if all payload symbols could be (error corrected and) decoded.

A problem to be solved by the invention is to provide a watermarking in which payload symbols can be decoded even if correctly received sync symbols are not available. This problem is solved by the methods disclosed in claims 1, 3 and 7. Apparatuses that utilise these methods are disclosed in claims 2, 4 and 8.

The invention allows transmitting and decoding frames without sync symbols or bits, which unexpectedly makes the WM detection much more robust although the additionally required processing power is small. Two reference sequences are used in prior art watermarking processings to represent the bit values 'zero' and 'one'. The invention uses for each payload symbol in a frame different reference sequence and for the bit values 'zero' and 'one' in each payload symbol different reference sequences, without using synchronisation symbols, and a logarithmic search is performed in the WM decoder to reduce the numbers of correlations to be calculated.

The invention makes watermarking of critical sound signals much more robust, which may make the difference between receiving WM and receiving no WM at all.

In principle, the inventive encoding method is suited for encoding symbols carrying payload data for watermarking therewith an audio or video signal, said watermarking using modulation with reference sequences, wherein said payload data symbols can be recovered at decoding side by demodulation using corresponding reference sequences, and wherein in each case a number N of said payload data symbols together form a watermark data frame and a number of M watermark data bits are assigned to each payload data symbol, including the steps:

- modulating said payload data for a current watermark data frame using $N*2^M$ different ones of said reference sequences, one reference sequence for each watermark data bit value, N being an integer greater than '1' and 'M' being an integer greater than '0', and assembling said payload data symbols of said current watermark data frame without adding synchronisation symbols;
- psycho-acoustically shaping said current watermark data frame and embedding it in said audio or video signal for output;
- continuing with the corresponding steps for the next watermark data frame.

In principle, the inventive decoding method is suited for decoding symbols carrying payload data of a watermarked audio or video signal wherein in each case a number N of said payload data symbols together form a watermark data frame and a number of M watermark data bits were assigned to each payload data symbol, and wherein said payload data for a watermark data frame were modulated using $N*2^M$ different reference sequences, one reference sequence for each watermark data bit value, N being an integer greater than '1' and 'M' being an integer greater than '0', and said payload data symbols of said watermark data frame were assembled without adding synchronisation symbols, and wherein said watermark data frames were psycho-acoustically shaped and embedded in said audio or video signal, said decoding method including the steps of:

- spectrally whitening said watermarked audio or video signal, which spectral whitening reverses said psycho-acoustical shaping;
- demodulating said modulated payload data for a current watermark data frame to get said payload data by:

a) dividing said $N*2^M$ different reference sequences in a first and a second half;

b) adding all reference sequences of the first half and adding all reference sequences of the second half;

c) correlating a corresponding section said spectrally whitened watermarked audio or video signal with the sum signal of said first half and with the sum signal of said second half;
d) if the first correlation is stronger than the second one, dividing the first half of said reference sequences in a first half and a second half, adding the reference sequences of that first half and adding the reference sequences of that second half, and continuing with step c),
 otherwise, dividing the second half of said reference sequences in a first half and a second half, adding the reference sequences of that first half and adding the reference sequences of that second half, and continuing with step c);
e) if the sum signal of said adding contains only one of said reference sequences, or if said current half contains only one of said reference sequences, considering it as being the correct reference sequence for the demodulation of the corresponding payload data symbol.

In principle the inventive encoding apparatus is suited for encoding symbols carrying payload data for watermarking therewith an audio or video signal, said watermarking using modulation with reference sequences, wherein said payload data symbols can be recovered at decoding side by demodulation using corresponding reference sequences, and wherein in each case a number N of said payload data symbols together form a watermark data frame and a number of M watermark data bits are assigned to each payload data symbol, said apparatus including:
 means being adapted for modulating said payload data for a current watermark data frame using $N*2^M$ different ones of said reference sequences, one reference sequence for each watermark data bit value, N being an integer greater than '1' and 'M' being an integer greater than '0', and assembling said payload data symbols of said current watermark data frame without adding synchronisation symbols;
 means being adapted for psycho-acoustically shaping said current watermark data frame and embedding it in said audio or video signal for output,
whereby thereafter said means continue their processing for the next watermark data frame.

In principle the inventive decoding apparatus is suited for decoding symbols carrying payload data of a watermarked audio or video signal wherein in each case a number N of said payload data symbols together form a watermark data frame and a number of M watermark data bits were assigned to each payload data symbol,
and wherein said payload data for a watermark data frame were modulated using $N*2^M$ different reference sequences, one reference sequence for each watermark data bit value, N being an integer greater than '1' and 'M' being an integer greater than '0', and said payload data symbols of said watermark data frame were assembled without adding synchronisation symbols,
and wherein said watermark data frames were psycho-acoustically shaped and embedded in said audio or video signal said decoding apparatus including:
 means being adapted for spectrally whitening said watermarked audio or video signal, which spectral whitening reverses said psycho-acoustical shaping;
 means being adapted for demodulating said modulated payload data for a current watermark data frame to get said payload data by:
a) dividing said $N*2^M$ different reference sequences in a first and a second half;
b) adding all reference sequences of the first half and adding all reference sequences of the second half;
c) correlating a corresponding section said spectrally whitened watermarked audio or video signal with the sum signal of said first half and with the sum signal of said second half;
d) if the first correlation is stronger than the second one, dividing the first half of said reference sequences in a first half and a second half, adding the reference sequences of that first half and adding the reference sequences of that second half, and continuing with step c),
 otherwise, dividing the second half of said reference sequences in a first half and a second half, adding the reference sequences of that first half and adding the reference sequences of that second half, and continuing with step c);
e) if the sum signal of said adding contains only one of said reference sequences, or if said current half contains only one of said reference sequences, considering it as being the correct reference sequence for the demodulation of the corresponding payload data symbol.

Advantageous additional embodiments of the invention are disclosed in the respective dependent claims.

DRAWINGS

Figure 1:
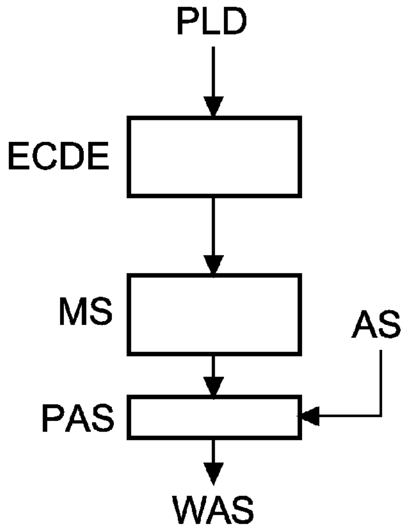
Figure 2:
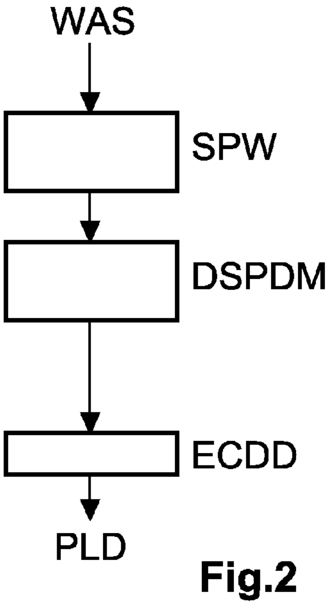
Figure 4:

Exemplary embodiments of the invention are described with reference to the accompanying drawings, which show in:

FIG. 1 inventive watermark signal encoder;

FIG. 2 inventive watermark signal decoder;

FIG. 3 known frame composition;

FIG. 4 watermark frame composition according to the invention.

EXEMPLARY EMBODIMENTS

As mentioned above, the weak point of using the known WM frame structure of FIG. 3 is the high dependence on the detection of the sync symbols. If for example the three sync symbols in the above frame are not detectable, all eight payload symbols are lost, even if they could be recovered, since it is not known which recovered value corresponds to which one of the symbols.

The invention does not use any sync symbol at all, as shown in the frame structure of FIG. 4 in which each frame or group of eight payload symbols Pld 1 to Pld8 is followed by the next frame or group of eight payload symbols.

Each one of the symbols in a frame uses unique reference sequences to encode its payload. For example, if each symbol transmits one bit, symbol 1 or payload Pld1 uses sequence 0 to encode the bit value '0' and sequence 1 to encode the bit value '1', symbol 2 or payload Pld2 uses sequence 2 to encode the bit value '0' and sequence 3 to encode the bit value '1', . . . , and symbol 8 or payload Pld8 uses sequence 14 to encode the bit value '0' and sequence 15 to encode the bit value '1'. Thereafter, in the following frame, symbol 1/payload Pld1 uses again sequence 0 to encode the bit value '0' and again sequence 1 to encode the bit value '1', and so on.

This kind of processing is much more robust than using sync bits, since errors in the payload symbols can be corrected by error correction, such that for example even if the first few symbols are missing, the payload can be recovered, which is not the case if using sync symbols.

If N is the number of symbols per frame and M the number of bits transmitted within each symbol, the inventive processing requires $N*2^M$ different reference sequences, each of which has a length represented by e.g. 16 bits. But this would also cause $N*2^M$ correlations to be carried out at detection side. However, because the reference sequences are orthogonal or nearly orthogonal, the following processing can be used to reduce substantially the number of required correlations for decoding each symbol:

1) Divide the $N*2^M$ reference sequences in a first and a second half.
2) Add all reference sequences of the first half and add all reference sequences of the second half (this each represents an adding of N*M analog signals in the time domain. The output are two digital time domain sum signals each one with a corresponding length of e.g. 16 bits).
3) Correlate a corresponding section of the audio signal with the sum signal of the first half and with the sum signal of the second half.
4) If the first correlation is higher or stronger than the second one, divide the first half of the reference sequences in a first half and a second half, add the reference sequences of that first half and add the reference sequences of that second half, and continue with step 3, otherwise, divide the second half of the reference sequences in a first half and a second half, add the reference sequences of that first half and add the reference sequences of that second half, and continue with step 3.
5) If the sum signal in the above processing contains only one sequence, or if the current half contains a single reference sequence only, the correct reference sequence has been found for the current symbol and the loop exits.

In the above example, $8*2^1=16$ reference sequences are required. That means, that also 16 correlations are to be calculated for each payload symbol.

Using the above processing, that is reduced to:

Correlating two times with the sum of 8 sequences;

Correlating two times with the sum of 4 sequences;

Correlating two time with the sum of 2 sequences;

Correlating two times with 1 sequence.

In total, this results in 8 correlations, thereby reducing the necessary computational power by a factor of 2.

Advantageously, the same logarithmic search processing can be used if the above-described known frame structure with sync symbols is used and more than one bit is transmitted per symbol, i.e. more than two reference sequences are to be tested per symbol.

In the watermarking encoder in FIG. 1, payload data PLD to be used for watermarking an audio signal AS is input to an optional error correction and/or detection encoding step or stage ECDE which adds redundancy bits facilitating a recovery from erroneously detected symbols in the decoder. The output of stage ECDE passes through a modulation and spectrum spreading step or stage MS, in which e.g. 16 different reference sequences are used (i.e. two per payload bit) to modulate the 8 payload symbols of one WM frame as described above, to an optional psycho-acoustical shaping PAS which shapes the WS signal such that the WM is not audible or visible. Step or stage PAS receives the audio stream signal AS and processes the WM frames symbol by symbol, without adding synchronisation symbols. After the processing for a WM frame is completed a correspondingly watermarked frame WAS embedded in the audio signal is output. Thereafter the processing continues for the frame $FR_{n+1}$ following the current frame.

In the watermarking decoder in FIG. 2 a watermarked frame WAS of the audio signal passes through an optional spectral whitening step or stage SPW (which reverses the shaping that was done in stage PAS) and a de-spreading and demodulation step or stage DSPDM which retrieves the embedded data from the signal WAS using the above-described processing steps 1) to 5). Thereafter the WM symbol can be passed to an error correction and/or detection decoding step or stage ECDD that outputs the valid payload data PLD.

The invention is not limited to using spread spectrum technology. Instead e.g. carrier based technology or echo hiding technology can be used for the watermarking coding and decoding.

The invention claimed is:

1. A method for encoding symbols carrying payload data for watermarking therewith an audio or video signal, said watermarking using modulation with reference sequences, wherein said payload data symbols can be recovered at decoding side by demodulation using corresponding reference sequences, and wherein in each case a number N of said payload data symbols together form a watermark data frame and a number of M watermark data bits are assigned to each payload data symbol, said method comprising the steps:

modulating said payload data for a current watermark data frame using $N*2^M$ different ones of said reference sequences, one reference sequence for each watermark data bit value, N being an integer greater than '1' and 'M' being an integer greater than '0', and assembling said payload data symbols of said current watermark data frame without adding synchronization symbols;

psycho-acoustically shaping said current watermark data frame and embedding it in said audio or video signal for output;

continuing with the corresponding steps for the next watermark data frame.

2. The method according to claim 1, wherein said watermarking is of spread spectrum type or is carrier based or uses echo hiding.

3. An apparatus for encoding symbols carrying payload data for watermarking therewith an audio or video signal, said watermarking using modulation with reference sequences, wherein said payload data symbols can be recovered at decoding side by demodulation using corresponding reference sequences, and wherein in each case a number N of said payload data symbols together form a watermark data frame and a number of M watermark data bits are assigned to each payload data symbol, said apparatus comprising:

means being adapted for modulating said payload data for a current watermark data frame using $N*2^M$ different ones of said reference sequences, one reference sequence for each watermark data bit value, N being an integer greater than '1' and 'M' being an integer greater than '0', and assembling said payload data symbols of said current watermark data frame without adding synchronization symbols;

means being adapted for psycho-acoustically shaping said current watermark data frame and embedding it in said audio or video signal for output, whereby thereafter said means continue their processing for the next watermark data frame.

4. The apparatus according to claim 2, wherein said watermarking is of spread spectrum type or is carrier based or uses echo hiding.

5. A method for decoding symbols carrying payload data of a watermarked audio or video signal wherein in each case a number N of said payload data symbols together form a watermark data frame and a number of M watermark data bits were assigned to each payload data symbol, and wherein said payload data for a watermark data frame were modulated using $N*2^M$ different reference sequences, one reference sequence for each watermark data bit value, N being an integer greater than '1' and 'M' being an integer greater than '0', and said payload data symbols of said watermark data frame were assembled without adding synchronization symbols, and wherein said watermark data frames were psycho-acoustically shaped and embedded in said audio or video signal, said decoding method comprising the steps of:

spectrally whitening said watermarked audio or video signal, which spectral whitening reverses said psycho-acoustical shaping;

demodulating said modulated payload data for a current watermark data frame to get said payload data by:

a) dividing said $N*2^M$ different reference sequences in a first and a second half;

b) adding all reference sequences of the first half and adding all reference sequences of the second half;

c) correlating a corresponding section said spectrally whitened watermarked audio or video signal with the sum signal of said first half and with the sum signal of said second half;

d) if the first correlation is stronger than the second one, dividing the first half of said reference sequences in a first half and a second half, adding the reference sequences of that first half and adding the reference sequences of that second half, and continuing with step c), otherwise, dividing the second half of said reference sequences in a first half and a second half, adding the reference sequences of that first half and adding the reference sequences of that second half, and continuing with step c);

e) if the sum signal of said adding contains only one of said reference sequences, or if said current half contains only one of said reference sequences, considering it as being the correct reference sequence for the demodulation of the corresponding payload data symbol.

6. The method according to claim 5, wherein said watermarking is of spread spectrum type or is carrier based or uses echo hiding.

7. The method according to claim 5, wherein said payload symbol data include error correction data and wherein on said demodulated payload data an error correction is performed.

8. An apparatus for decoding symbols carrying payload data of a watermarked audio or video signal wherein in each case a number N of said payload data symbols together form a watermark data frame and a number of M watermark data bits were assigned to each payload data symbol, and wherein said payload data for a watermark data frame were modulated using $N*2^M$ different reference sequences, one reference sequence for each watermark data bit value, N being an integer greater than ‘1’ and ‘M’ being an integer greater than ‘0’, and said payload data symbols of said watermark data frame were assembled without adding synchronization symbols, and wherein said watermark data frames were psycho-acoustically shaped and embedded in said audio or video signal, said decoding apparatus comprising:

means being adapted for spectrally whitening said watermarked audio or video signal, which spectral whitening reverses said psycho-acoustical shaping;

means being adapted for demodulating said modulated payload data for a current watermark data frame to get said payload data by:

a) dividing said $N*2^M$ different reference sequences in a first and a second half;

b) adding all reference sequences of the first half and adding all reference sequences of the second half;

c) correlating a corresponding section said spectrally whitened watermarked audio or video signal with the sum signal of said first half and with the sum signal of said second half;

d) if the first correlation is stronger than the second one, dividing the first half of said reference sequences in a first half and a second half, adding the reference sequences of that first half and adding the reference sequences of that second half, and continuing with step c), otherwise, dividing the second half of said reference sequences in a first half and a second half, adding the reference sequences of that first half and adding the reference sequences of that second half, and continuing with step c);

e) if the sum signal of said adding contains only one of said reference sequences, or if said current half contains only one of said reference sequences, considering it as being the correct reference sequence for the demodulation of the corresponding payload data symbol.

9. The apparatus according to claim 8, wherein said watermarking is of spread spectrum type or is carrier based or uses echo hiding.

10. The apparatus according to claim 8, wherein said payload symbol data include error correction data and wherein on said demodulated payload data an error correction is performed.

11. A method for decoding symbols carrying payload data of a watermarked audio or video signal wherein in each case a number N of said payload data symbols together form a watermark data frame and a number of M watermark data bits were assigned to each payload data symbol, and wherein said payload data for a watermark data frame were modulated using $N*2^M$ different reference sequences, one reference sequence for each watermark data bit value, N being an integer greater than ‘1’ and ‘M’ being an integer greater than ‘1’, and wherein said watermark data frames were embedded in said audio or video signal, said decoding method comprising the steps of:

demodulating said modulated payload data for a current watermark data frame to get said payload data by:

a) dividing said $N*2^M$ different reference sequences in a first and a second half;

b) adding all reference sequences of the first half and adding all reference sequences of the second half;

c) correlating a corresponding section said spectrally whitened watermarked audio or video signal with the sum signal of said first half and with the sum signal of said second half;

d) if the first correlation is stronger than the second one, dividing the first half of said reference sequences in a first half and a second half, adding the reference sequences of that first half and adding the reference sequences of that second half, and continuing with step c), otherwise, dividing the second half of said reference sequences in a first half and a second half, adding the reference sequences of that first half and adding the reference sequences of that second half, and continuing with step c);

e) if the sum signal of said adding contains only one of said reference sequences, or if said current half contains only one of said reference sequences, considering it as being the correct reference sequence for the demodulation of the corresponding payload data symbol.

12. An apparatus for decoding symbols carrying payload data of a watermarked audio or video signal wherein in each case a number N of said payload data symbols together form a watermark data frame and a number of M watermark data bits were assigned to each payload data symbol, and wherein said payload data for a watermark data frame were modulated using $N*2^M$ different reference sequences, one reference sequence for each watermark data bit value, N being an integer greater than '1' and 'M' being an integer greater than '1', and wherein said watermark data frames were embedded in said audio or video signal, said decoding apparatus comprising:

means being adapted for demodulating said modulated payload data for a current watermark data frame to get said payload data by:

a) dividing said $N*2^M$ different reference sequences in a first and a second half;

b) adding all reference sequences of the first half and adding all reference sequences of the second half;

c) correlating a corresponding section said spectrally whitened watermarked audio or video signal with the sum signal of said first half and with the sum signal of said second half;

d) if the first correlation is stronger than the second one, dividing the first half of said reference sequences in a first half and a second half, adding the reference sequences of that first half and adding the reference sequences of that second half, and continuing with step c), otherwise, dividing the second half of said reference sequences in a first half and a second half, adding the reference sequences of that first half and adding the reference sequences of that second half, and continuing with step c);

e) if the sum signal of said adding contains only one of said reference sequences, or if said current half contains only one of said reference sequences, considering it as being the correct reference sequence for the demodulation of the corresponding payload data symbol.

* * * * *